No. 719,495. PATENTED FEB. 3, 1903.
W. N. NEWTON.
HAY PRESS.
APPLICATION FILED JUNE 28, 1902.
NO MODEL.
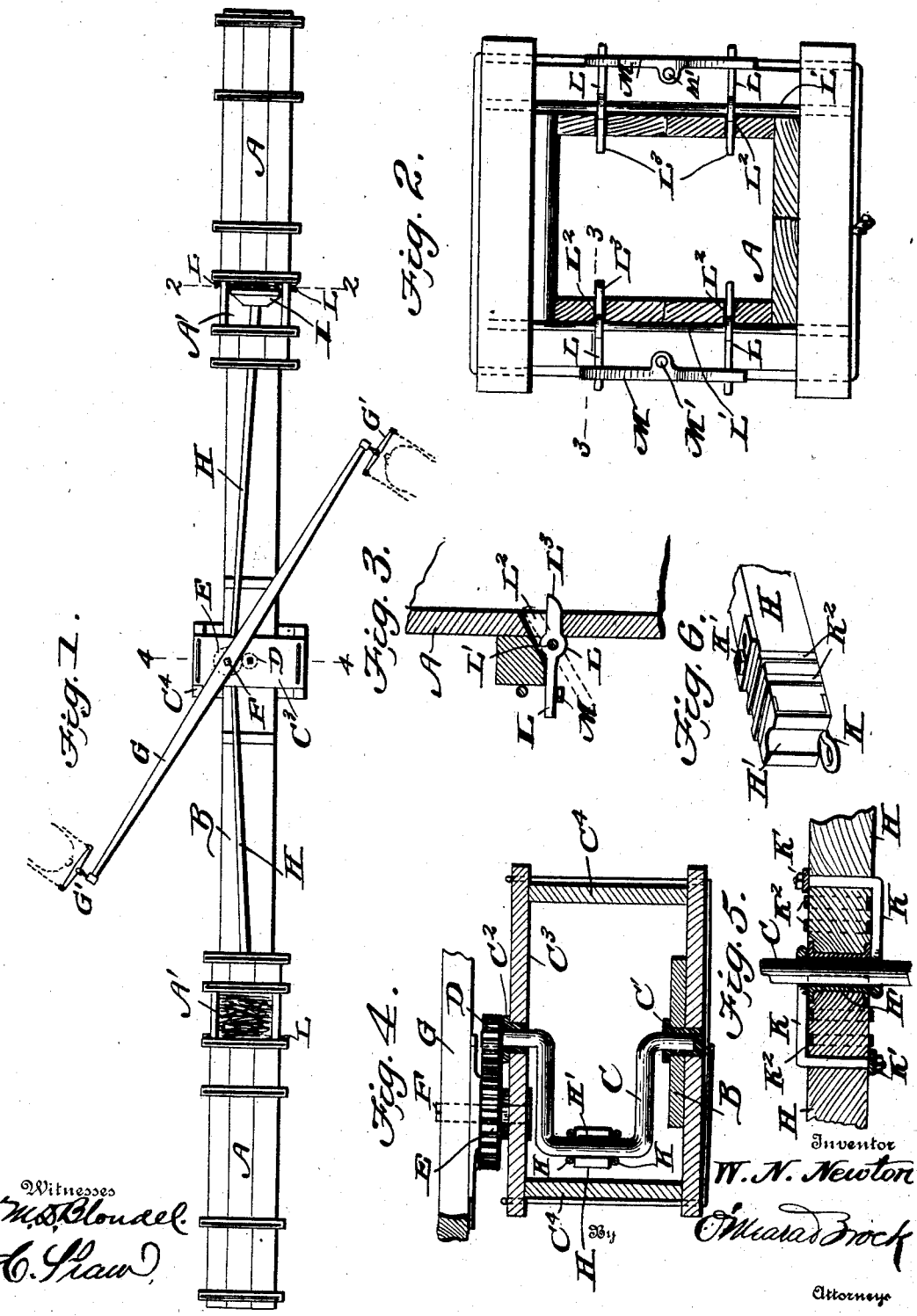
Witnesses
Inventor
W. N. Newton
Attorneys

United States Patent Office.

WILLIAM NETSON NEWTON, OF BARNESVILLE, GEORGIA, ASSIGNOR OF ONE-HALF TO J. J. GARLAND, OF THE ROCK, GEORGIA.

HAY-PRESS.

SPECIFICATION forming part of Letters Patent No. 719,495, dated February 3, 1903.

Application filed June 28, 1902. Serial No. 113,606. (No model.)

*To all whom it may concern:*

Be it known that I, WILLIAM NETSON NEWTON, a citizen of the United States, residing at Barnesville, in the county of Pike and State of Georgia, have invented a new and useful Hay-Press, of which the following is a specification.

This invention relates generally to hay-presses, and more particularly to a double press, whereby two bales can be formed at one time.

Another object of the invention is to provide an exceedingly simple means for holding the compressed hay in place; and with these objects in view the invention consists in the peculiar construction of the various parts and in their novel combination or arrangement, all of which will be fully described hereinafter and pointed out in the claims.

In the drawings forming part of this specification, Figure 1 is a top plan view of a hay-press constructed in accordance with my invention. Fig. 2 is a transverse sectional view on the line 2 2 of Fig. 1. Fig. 3 is a detail section on the line 3 3 of Fig. 2, illustrating the special construction of mechanism for retaining the compressed hay in place. Fig. 4 is a transverse sectional view on the line 4 4 of Fig. 1, illustrating the motive power for operating the plungers. Fig. 5 is a detail sectional view illustrating the manner of connecting the plungers to the crank-shaft, and Fig. 6 is a detail perspective view of one end of one of the plungers.

In carrying out my invention I employ the baling-boxes A, said boxes being built up substantially the same as baling-boxes in general use, having feed-hoppers A', through which the hay is introduced, and these baling-boxes also have side openings to permit the wiring of the bale. The baling-boxes are united by means of a base-board B, and the power mechanism is arranged centrally of the base-board, as most clearly shown in Fig. 1. This power mechanism consists, essentially, of a crank-shaft C, which is journaled at its lower end in a suitable bushing C', fixed upon the base-board, its upper end turning through a bushing $C^2$, located in a cross-piece $C^3$, supported upon standards $C^4$. The upper end of the crank-shaft carries a pinion D and meshes with a gaar-wheel E, which is rigidly attached to the axle or pivot F of the sweep G, said sweep being preferably provided with the whiffletree G' at each end, though one whiffletree only can be employed, if so desired.

H indicates the pitmen carrying the plungers I, said pitmen being connected at their inner ends to a crank-shaft C, so that at each revolution of the said crank one pitman will be operated to effect a compression, while the other pitman is being withdrawn to permit the hay to be fed to the baling chamber or box. The end of the pitman H has a grooved ferrule H', which bears against the crank-shaft C. The end of the pitman C is pivotally connected to the crank-shaft by means of a bolt K, the crank of which is right-angled in shape, one portion resting upon the face of the pitman, while the other member passes through the pitman and receives a nut K'. Suitable strengthening-bands $K^2$ are also arranged around the end of the pitman.

Referring to Fig. 5, it will be noted that one eyebolt is arranged upon the upper face of the pitman, while the other eyebolt is arranged upon the lower face of its pitman. This permits the ends of the pitmen to be brought together in the same horizontal plane and also provides a positive pivotal attachment both above and below the same. The sweep could be attached directly to the upper end of the crank-shaft; but in practice I prefer to interpose the pinion and gear for the purpose of increasing the number of reciprocations of the pitmen and plunger.

In order to hold the hay in its proper compressed position, I employ the retaining-levers L, pivoted at each side of the baling-boxes upon the upright rods L', the inner ends working through slots $L^2$, produced in the sides of the baling-boxes, said ends being beveled, as shown at $L^3$, to permit the hay to pass freely beyond the same during the act of compression. The outer ends of these levers contact with a spring bar or plate M, which is fastened to one of the upright chambers, said bar or plate being preferably fastened intermediate the retaining-levers, as most clearly shown at M' in Fig. 2, the free ends of said spring bar or plate normally contacting with the ends of the levers, holding them in such position as to prevent the retrocession of the compressed hay.

It will thus be seen that I provide an exceedingly simple and durable construction of hay-press, which can be used either single or double and one which is not likely to get out of order, owing to the simplicity of the small number of parts employed.

While I have shown my hay-press as operated by means of horse-power, it will of course be understood that steam can be employed, if so desired.

Having thus fully described my invention, what I claim as new, and desire to secure by Letters Patent, is—

1. In a hay-press, the combination with the crank-shaft and means for operating the same, of the pitmen having grooved ferrules at their opposing ends, and the oppositely-disposed eyebolts attached to the pitmen, substantially as shown and described.

2. In a baling-press, the combination with the crank-shaft, and means for operating the same, of the pitmen having grooved ferrules at their opposing ends, and the oppositely-disposed eyebolts, the shanks of which are right-angular in shape, substantially as described.

3. The combination with the baling-boxes having horizontal wedge-shaped slots in their sides, a vertical beam adjacent said slotted portion having a beveled edge in alinement with the inclined edge of the slot, a vertical rod adjacent said beam, levers having an inner beveled end pivoted on said rod, said bevel end normally projecting into the baling-box, and a spring adapted to bear on the outer ends of the levers and hold them in their normal position.

WILLIAM NETSON NEWTON.

Witnesses:
R. H. POWELL,
ROBT. HOLMES.